Jan. 31, 1928.

H. FORD 1,657,858

TRANSMISSION

Filed May 5, 1926

INVENTOR
Henry Ford.
BY
ATTORNEY

Jan. 31, 1928.  H. FORD  1,657,858

TRANSMISSION

Filed May 5, 1926    4 Sheets-Sheet 2

INVENTOR
Henry Ford
BY
ATTORNEY

Jan. 31, 1928.

H. FORD

TRANSMISSION

Filed May 5, 1926 4 Sheets-Sheet 3

1,657,858

INVENTOR
Henry Ford
BY E. H. Davis
ATTORNEY

Jan. 31, 1928.

H. FORD 1,657,858

TRANSMISSION

Filed May 5, 1926    4 Sheets-Sheet 4

INVENTOR
Henry Ford
BY
ATTORNEY

Patented Jan. 31, 1928.

1,657,858

UNITED STATES PATENT OFFICE.

HENRY FORD, OF DEARBORN, MICHIGAN.

TRANSMISSION.

Application filed May 5, 1926. Serial No. 106,822.

The object of my invention is to provide new and useful improvements in a transmission of simple, durable and inexpensive construction.

A further object of my invention is to provide a transmission which may be disposed rearwardly of the universal joint in a motor vehicle as distinguished from being placed between the engine and the universal joint.

A further object of my invention is to provide a transmission which will provide a normally operated transmission of the planetary type and having two forward speeds and one reverse speed in combination with an auxiliary transmission device comprising a clutch for direct drive and a selectively engageable reduction gear whereby the gear ratio between the engine and the rear wheels may be varied by the auxiliary transmission but the vehicle will be handled normally by the main or regular transmission in the same manner as motor vehicles are normally handled.

A further object of my invention is to provide an auxiliary transmission of the character described, comprising a clutch device for engaging the parts to form a direct drive and to provide a selectably engageable planetary reduction gearing in combination therewith.

Still a further object of my invention is to provide a transmission of the planetary type and having the planetary gearing, the clutch and the auxiliary transmission device enclosed within the drums of the transmission to thereby form a compact and efficient construction.

Still a further object of my invention is to provide a control lever which may be operated in one plane to shift the control members of the auxiliary transmission and which may be operated in another plane to operate the brake provided in connection with the main transmission.

Still a further object of my invention is to provide a transmission which may be disconnected from both the drive shaft and the engine through suitable clutches, whereby repairs, moving of the vehicle and starting of the engine may be facilitated.

Still a further object of my invention is to provide a novel form of clutch device for use in connection with a planetary gearing, whereby the clutching action is accomplished by securing together selectively two of the members of the planetary gear set to thereby cause all three of such members to rotate as a unit.

Still a further object of my invention is to provide a planetary type of transmission having a clutch device disposed between planetary gearing and the engine shaft.

With these and other objects in view, my invention consists in the arrangement, combination, and construction of the various parts of my improved device, as described in the specification, claimed in my claims, and shown in the accompanying drawings, in which:

Figure 8:
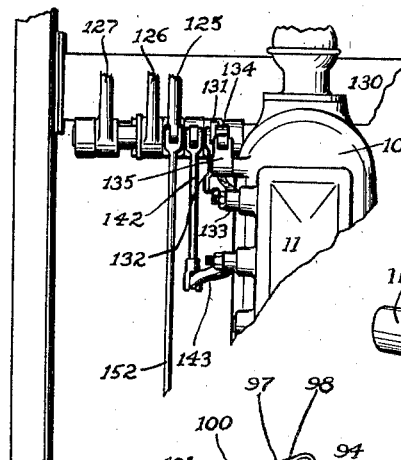

Figure 7 shows a diagrammatical view illustrating the various parts of my improved transmission approximately in their relative positions, except as to certain parts which cannot be so shown without complicating the figure and the parts being shown in perspective to somewhat better illustrate their construction, and Figure 8 shows a top or plan view of the transmission to illustrate the connections of the pedals and their shafts.

Referring to the accompanying drawings, I have used the reference letter "A" to designate the engine usually provided in connection with a motor vehicle and the reference letter "B" to indicate generally the universal joint. "C" is the transmission, "D" the vehicle drive shaft and "E" the rear axle of the vehicle. It will be understood that these parts are shown somewhat diagrammatically, except as to the transmission as they only form a part of my invention in so far as they cooperate with the transmission.

The transmission is housed in a substantially cylindrical hollow cast structure 10 having contracted ends faced up to be secured to the rear housing of the universal joint "B" and the forward end of the drive shaft housing "D". The top of this housing 10 is provided with an opening designed to give access to some of the transmission operating parts which is closed by a cover 11. A transmission drive shaft 12, illustrated in perspective in Figure 7, extends substantially through the transmission housing 10 and is journaled at the forward end thereof in a ball bearing member 13 which in turn is mounted in the shell 14 which forms the rear member of the universal housing "B". This shaft 12 is splined at 15 to cooperate with the rear member of the universal joint so that it will be driven thereby and of course the universal joint receives its motion from the crank shaft of the engine. The universal joint construction and engine crank shaft are not here shown as they may be of any ordinary construction and as they form no part of my invention except in so far as they furnish power therefor.

Intermediate of the ends of the shaft 12 a flange 16 is formed and in the embodyment of my invention here disclosed this flange 16 is an integral part of the shaft 12. This flange 16 has three outwardly extending arms 17 which are really part of the flange itself and there are cutaway portions between these arms 17 which give clearance for the planetary gears which will hereinafter be described. Bolts or rivets 18 extend through these arms 17 and through the two parts of the shell forming the support for the aforesaid planetary gears so that this flange 16 may form the support through the said shell for these planetary gears. The two parts of the planetary gear supporting shell are illustrated at 19 and 20 respectively in Figure 7 in perspective and the adjacent webs 21 thereof are secured together and to the flange 16 by the rivets 18 above mentioned. Three trunnions 22 extend between bearing bosses 23 on the planetary gear supporting shell members 19 and 20, these bearing bosses being disposed at the ends of the shell members 19 and 20 which are spaced apart from each other and the trunnions 22 form the support for three triple gears which I have designated generally by the reference numeral 24. These triple gears which I have designated generally by the reference numeral 24 have 3 sets of teeth thereon, the teeth or gear member 25 being the gear which imparts rotation to the drive shaft, the larger gear member 26 being the gear which contacts with the teeth on the slow speed transmission drum and the gear 27 being the gear which contacts with the teeth connected with the reverse drum.

Figure 2:
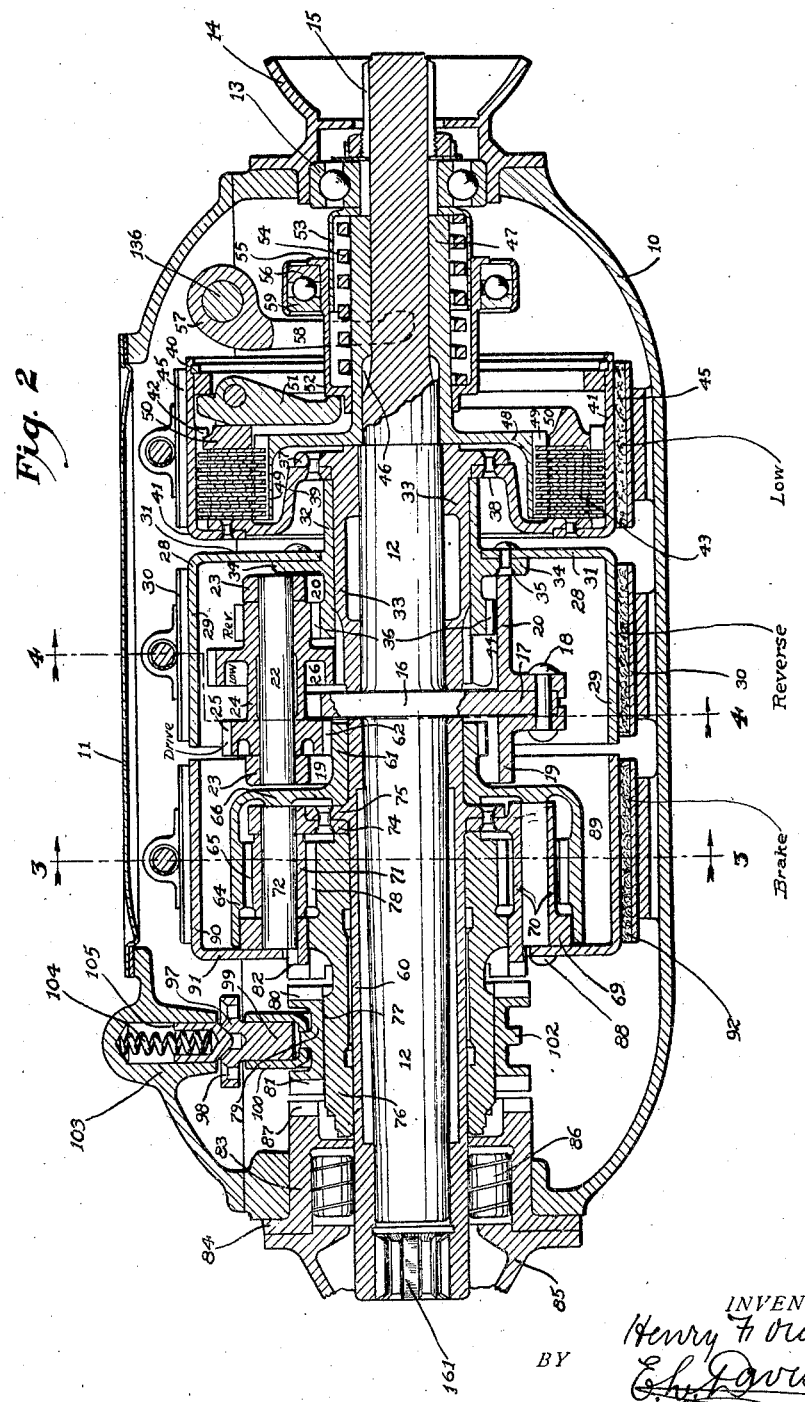
Figure 2 shows a longitudinal, vertical, central sectional view of the transmission illustrated in Figure 1.

The gears 25 and 26 are spaced apart somewhat so that the sleeve connecting them may be as small as possible and so that this sleeve may pass through the cutaway portions of the flange 16 between the extensions 17 thereof. The gears 25 are disposed in the transmission in position adjacent to the section 19 of the planetary gear supporting shell and the gears 26 and 27 are supported in position adjacent to the section 20 of the said shell. The positions of these parts are best illustrated in Figure 2.

The reverse drum 28 is disposed substantially in the center of the transmission housing and surrounds the planetary gears heretofore mentioned. This reverse drum 28 in the form here shown comprises a cup-shaped member which may be formed of sheet metal with the flange 29 against which the reverse band 30 may contact and a vertical web 31, having a central opening therein, through which the shaft 12 and other adjacent parts may pass, a sleeve 32 is journaled on a sleeve 33 which in turn is journaled on the shaft 12 just forward of the flange 16. This sleeve 32 has an outwardly extending annular flange 34 designed to be secured by rivets 35 or other suitable means to the vertical web 31 of the reverse drum. Inwardly of the flange 34, that is between the flange 34 and the flange 16 of the shaft 12, a gear member having teeth 36 is formed at the end of the sleeve 32.

The sleeve 33, as has been heretofore noted, is journaled on the shaft 12 and within the sleeve 32. At the end of this sleeve 33 opposite the flange 16 an outwardly extending annular flange 37 is formed to which is riveted at 38, or secured by other suitable means, an off-set disc 39 which forms the web of the low speed drum 40. This low speed drum 40 differs in construction from the reverse drum 28 in that the web 39 thereof is formed separately from the band engaging flange 41 and in that the flange 41 has teeth 42 formed therein which are designed to receive correspondingly shaped teeth in the outer edges of the alternate discs of a friction disc clutch assembly such as is shown at 43.

The end of the sleeve 33 adjacent to the flange 16 of the shaft 12 has teeth 44 formed thereon. These teeth mesh with the teeth of the gears 26 of the planetary triple gears. The low speed drum 40 is designed to be held from rotation when desired by a transmission band 45.

The shaft 12, adjacent to the contracted end having the splines 15 thereon, between said splines 15 and the portion thereof upon which the sleeve 33 is journaled, has a splined section 46 upon which a sleeve 47 is non-rotatably mounted. This sleeve 47 has an annular outwardly extending web 48 at the end thereof adjacent to the flange 16 of the shaft 12 which forms a support for an annular flange 49 which has teeth formed in the exterior surface thereof designed to co-act with correspondingly formed teeth on the inner surface of the clutch discs on the friction disc clutch assembly 43.

An annular clutch operating ring 50 is designed to be normally yieldingly pressed against the friction disc clutch assembly 43 by fingers 51 which in turn are actuated by contact with one section 52 of a thimble which is loosely mounted on the sleeve 47. A second section 53 of the thimble is telescopically mounted within the section 52 and around the sleeve 47 whereby these sections together form a housing for the clutch spring 54. One end of the section 52 has an annular outwardly extending flange 55 designed to co-act with one race-way 56 of a thrust ball bearing assembly. A clutch operating fork 57 having arms 58 thereon straddles the shaft 12 in such position that the ends of the arms 58, as indicated by dotted lines may contact with the second race-way 59 of the ball bearing assembly heretofore mentioned so that operation of the clutch operating fork which moves the arms 58 thereof forwardly will, through said ball bearing assembly, also move the thimble 52 forwardly, thereby releasing the pressure on the clutch operating fingers 51 and consequently the pressure on the friction disc clutch assembly 43.

Rearwardly of the flange 16 a sleeve 60 is journaled, this sleeve 60 having a splined hollow end 161 designed to be connected with a correspondingly splined end of the vehicle drive shaft to form the final drive from the transmission. Journaled on the forward end of this sleeve 60 is a sleeve 61 which is designed to be connected to the final drive sleeve 60 by the auxiliary transmission mechanism which has heretofore been mentioned and which will hereafter be described. The forward end of the sleeve 61 has teeth 62 thereon which co-act with the gears 25 of the planetary triple gears and which thereby receive the driving force from the main transmission.

In order to simplify the explanation of this transmission, I will now describe the driving connections from the shaft 12 to the sleeve 61 and the operation of such connections before proceeding to describe the operation of this auxiliary transmission construction which has heretofore been mentioned.

I have heretofore described this transmission as being of the planetary type as such transmissions are generally given that name, although it is really of the type known to engineers as the epicycloidal type.

The driving impulse from the engine is of course always in the same direction in the ordinary motor vehicle and is received in this transmission from the crank shaft of the engine through the universal joint mechanism and imparted to the splines 15 at the forward end of the shaft 12 of my improved transmission.

When the vehicle is to be started, the connections which will hereinafter be described of the control pedals are such that actuation of the low speed brake band 45 will stop the low speed drum 40 from movement and at the same time will operate the clutch fork 57 to disconnect the clutch assembly 43. Rotation of the shaft 12 through the engine will then cause the flange 16 to rotate which in turn causes the planetary gear shell to rotate which in turn carries around with it the planetary triple gears 24. As the low speed drum 40 is connected through the web 39 with the sleeve 33 and the teeth 44, these parts will be held from rotation and the gears 26 of the planetary triple gears will, therefore, be caused to roll around the teeth or gear 44. This in turn will cause the gear 25, which must of course rotate with the same speed as the gear 26 to engage the teeth 62 on the sleeve 61 and impart rotation to this sleeve in the manner well known in such transmissions, this rotation being imparted through the auxiliary transmission hereafter to be described to the final drive sleeve 60. With the arrangement of gearing and teeth shown the "proportions" are such that this rotation of the connections just mentioned will, when the low speed drum is held from rotation, impart a rotation to the final drive sleeve 60 in the same direction as the transmission drive shaft 12 is rotating but at a very much slower speed.

When the transmission is to be operated to reverse the direction of rotation of the final drive sleeve 60 as compared with the shaft 12, the transmission band 30 is actuated to hold the reverse drum 28 from movement. As heretofore noted this reverse drum 28 is connected through the sleeve 32 with the teeth 36, which in turn mesh with the gears 27 of the transmission triple gears. When the shaft 12 is rotated to carry the planetary shell around by means of the flange 16 and to thereby carry planetary transmission triple gears around, the holding of these teeth 36 from movement will cause the gears 25 to impart to the sleeve 61, through teeth 62, a rotation in a direction opposite to that of the rotation of the shaft 12 and at a very much slower speed. This rotation of the sleeve 61 is in turn transmitted as has been heretofore stated, to the final drive sleeve 60.

When it is desired to operate this transmission in what is usually termed high or direct drive, the clutch fork 57 is moved to position to allow the spring 54 to press the thimble 52 against the clutch operating fingers 51 and thereby cause the clutch operating ring 50 to press the members of the friction disc clutch assembly 43 together to thereby lock the sleeve 47 from rotation relative to the low speed drum 40.

As has been heretofore noted, the low speed drum 40 is connected through the web 39 with the sleeve 33 and the teeth thereon 44. These teeth in turn coact with the gear 26 of the planetary triple gears. It will thus be seen that the locking of the low speed drum to the drive shaft 12 through the clutch member and the sleeve 47 will cause the teeth 44 to rotate at the same speed that the gears 26 are being carried around the shaft 12 by the flange 16 and the planetary spider member so that the gears 24 will also be carried around the shaft 12 at the same speed as the shaft 12 is being rotated and the gear 24 will remain stationary with reference to pins 22, rotation will therefore be imparted to the sleeve 61 through the teeth 62 from the teeth 25 at the same speed that the shaft 12 is traveling and consequently the final drive sleeve 60 will be caused to rotate at the same speed as the shaft 12, except in so far as this may be modified by the auxiliary transmission heretofore mentioned.

It will thus be seen that rotation is imparted through my main transmission to the sleeve 61 by operating the clutch assembly 43, the low speed transmission band 45 or the reverse transmission band 30 respectively in direct, reduced, or reverse relation to the speed of the main transmission drive shaft 12.

I shall now proceed to describe the auxiliary transmission whereby rotation may be imparted through the main transmission heretofore described from the shaft 12 to the final drive sleeve 60 at either the speed of the main transmission drive shaft 12 or at a materially reduced speed. The sleeve 61, as will be noted in figure 7, is part of a housing 63 which comprises an annular flange 64 having internal teeth 65 therein and a vertical web 66 whereby the flange is connected to the sleeve 61. Journaled in the flange 64 is a planetary spider member to which I have given the general reference numeral 67 which comprises spaced webs 68 and 69 which are connected by longitudinal struts 70 which are preferably formed integrally with the webs 68 and 69. These webs are properly spaced so that three planetary gears 71 may be journaled on three pins 72 which are extended between the webs 68 and 69. These gears are so placed that their outer teeth may mesh constantly with the internal teeth 65 on the flange 64 of the planetary shell 63. An inwardly extending annular flange 74 on the planetary spider 67 is secured by rivets or the like to an outwardly extending annular flange 75 which is formed preferably integrally with the final drive sleeve 60 and adjacent to the sleeve 61 of the planetary shell 63. A sleeve 76 is journaled on the final drive sleeve 60 adjacent to the rear end thereof. This sleeve 76 has splines 77 adjacent to one end thereof and teeth 78 formed adjacent to the opposite end thereof. These teeth 78 are disposed within the auxiliary planetary reduction gear section of the transmission in position to mesh constantly with the inner teeth of the planetary gears 71. A double ended clutch member 79 has teeth 80 at the forward end thereof and teeth 81 at the rearward end thereof. Teeth 82 are formed integrally with the planetary spider 67 at the end 68 thereof in position to mesh with the teeth 80 at the forward end of the auxiliary clutch member 79.

A fixed sleeve 83 is mounted in the opening at the rear end of the transmission housing 10 and provided with a flange 84 whereby it may be secured in said opening in the transmission housing and whereby the forward end 85 of the drive shaft housing may be secured to the transmission housing. The central inner portion of this sleeve 83 forms a race-way for roller bearings 86 which form the journal for the rear end of the final drive sleeve 60. The forward end of this sleeve 83 has teeth 87 designed to connect with teeth 81 on the rear end of the double ended auxiliary transmission clutch.

The operation of the auxiliary transmission is as follows: Rotation in any given direction is imparted to the sleeve 61 and consequently to the planetary transmission housing 63 which has just been described. If it is desired to drive the final drive sleeve 60 at the same speed as the sleeve 61 is being operated, the double ended clutch member 79 is moved to position so that the teeth 80 thereon engage the teeth 82 on the rear end planetary spider 67. This causes the planetary spider 67 to rotate at the same speed as the sleeve 76. As the clutch member 79 is fixed from rotation relative to the sleeve 76 and as this sleeve 76 has the teeth 78 thereon meshing with the teeth of the planetary gears 71, it will be seen that the fixing of the spider relative to the sleeve 76 will operate to prevent the gears 71 from rotating on their pins 72. Hence the rotation of the planetary shell 64 will operate to carry the planetary gears 71 and consequently the planetary spider 67 around the shaft 12 and the final drive sleeve 60 at the same speed as the sleeve 61 is being rotated. As the spider 67 is fixed to the final drive sleeve 60 through the flanges 74 and 75, it will be seen, therefore, that in this position of the clutch 79, rotation will be imparted from the sleeve 61 to the sleeve 60 or the final drive sleeve at the same speed. This connection may be termed a direct drive through the auxiliary transmission.

If, however, the clutch 79 of the auxiliary transmission is moved rearwardly so that the teeth 81 thereon engage the teeth 87 on the fixed sleeve 83, it will be seen that the sleeve 76 will be held from rotation due to its splined connection with the clutch 79 and consequently the teeth 78 on the sleeve 76 will be held from rotation. If now the main transmission be operated to impart rotation to the sleeve 61 it will be seen that through the flange 64 and teeth 65 of the planetary shell such rotation will cause the planetary gears 71 to roll round the now fixed teeth 78 to thereby impart rotation to the planetary spider 67 at a speed which is but a portion of that at which the sleeve 61 is rotating; that is, the fixing of the sleeve 76 causes rotation of the sleeve 61 to be imparted to the final drive sleeve 60 through the flanges 74 and 75 but at a reduced speed as compared with the speed of the sleeve 61.

From the foregoing it will be seen that operation of the main transmission at any of its ordinary ratios may cause rotation to be imparted to the drive shaft of the vehicle at either of two predetermined speed ratios due to the action of the auxiliary transmission, and this change in speed ratio is accomplished through operation of the clutch 79 of the auxiliary transmission.

Fixed to the planetary spider 67, as by rivets 88 is the brake drum 89 which comprises an annular flange 90 and a web 91 having a central opening therein designed to permit the shaft 12 and its associated parts to pass therethrough. It will be noted that this brake drum 89 is of cup shape and faces the reverse drum 28 whereby I am enabled to house the auxiliary transmission mechanism in the brake drum 89 and the main transmission mechanism mainly in the reverse drum 28, thereby securing a compact efficient gear construction.

As the planetary spider 67 is secured through the flanges 74 and 75 to the final drive sleeve 60 and the brake drum 89 is secured to the planetary spider, it will be seen that action of the brake band 92 has a direct braking action on the drive shaft of the vehicle through the positive connections of the parts just mentioned.

I have provided the following mechanism for operating the double ended clutch member 79 of the auxiliary transmission. A boss 93 is formed in a suitable place adjacent to one side of the interior of the transmission housing 10 and a vertical stud 94 extending therefrom forms a pivot for a bell crank lever having arms 95 and 96. The arm 96 extends to position above the clutch member 79 of the auxiliary transmission and is provided with an enlarged end 97 having three notches 98 therein and a downwardly extending stud 99. This stud fits in a sleeve 100 mounted above the clutch member 79 and which has a pair of forked arms 101 which are channel shaped in cross section so that they may permit a rib 102 on clutch member 79 to rotate therein but so that the clutch member may be moved longitudinally by this fork 101. A hollow boss 103, formed at the top of the transmission housing and illustrated in Figure 2 has a spring 104 mounted therein and pressing against the follower 105 having a tapered end which is designed to be yieldingly pressed by the spring 104 into the adjacent notch 98 of the enlarged end 97 of the arm 96 of the bell crank lever. This follower 105 is slidably mounted in the hollow inside of the boss 103 for vertical reciprocation.

Figure 3:
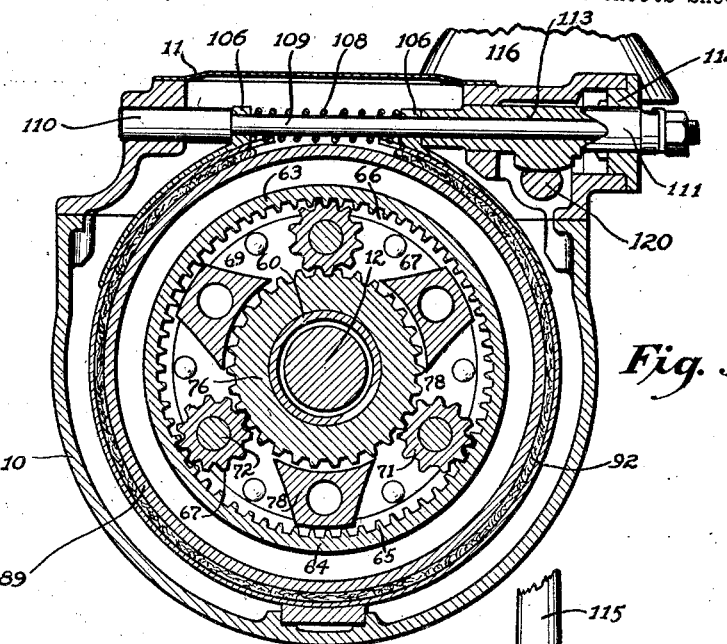
Figure 3 shows a transverse vertical sectional view taken on the line 3—3 of Figure 2.
Figure 4:
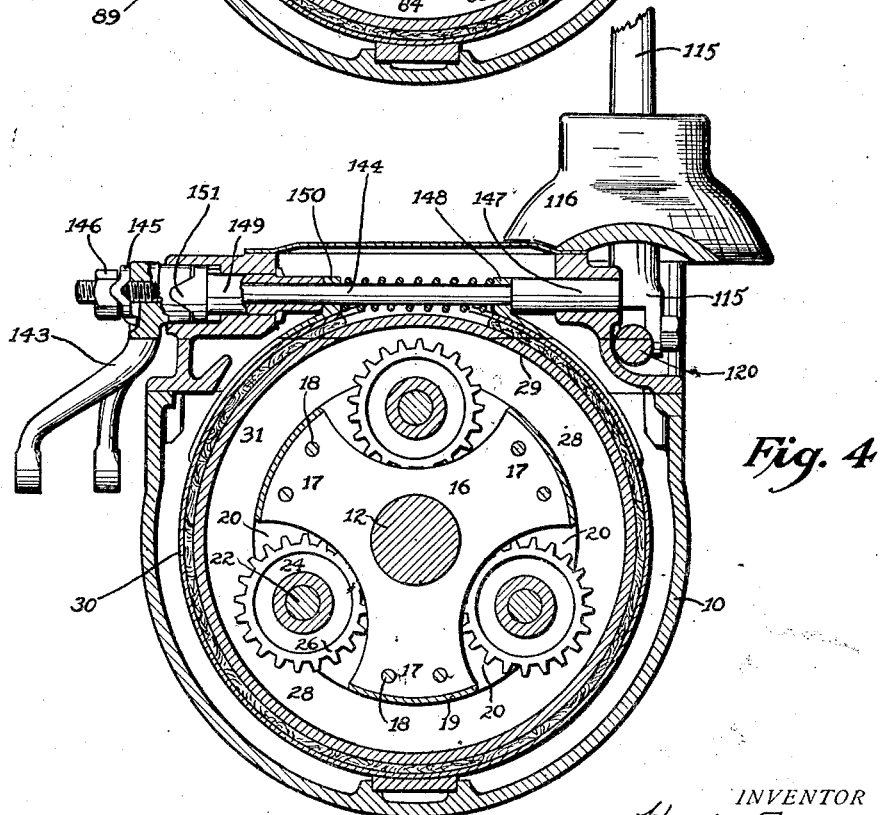
Figure 4 shows a similar view taken on the line 4—4 of Figure 2.
Figure 6:
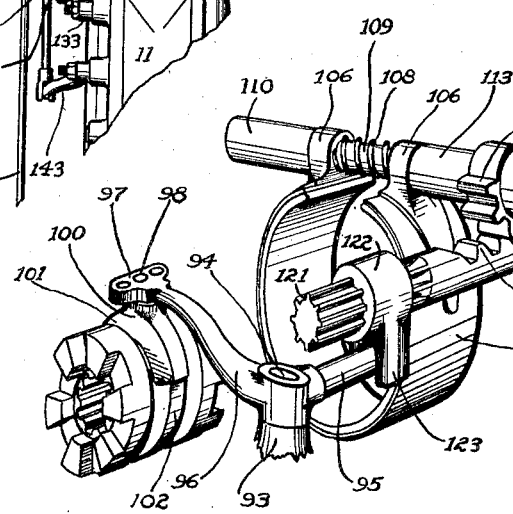
Figure 6 shows a perspective diagrammatical view illustrating the operating connections between the combined brake and shifter lever and the auxiliary transmission clutch and transmission brake.

The brake band 92 is provided with ears 106 adjacent to each end thereof which are normally yieldingly held apart by a coil spring 108. A shaft 109 extends through bosses in the upper part of the transmission housing 10 and forms a support and guide for the ears 106 by being extended therethrough. An enlarged portion 110 adjacent to one end of this shaft 109 is secured into the transmission housing in any suitable manner and forms a stop for the adjacent ear 106. At the opposite end of the shaft 109 and at the upper right hand corner, as illustrated in Figure 3, a cam member 111 is longitudinally adjustably and non-rotatably mounted on the shaft 109 in a gland 112 which is mounted in the housing 10. A co-operating cam member 113 is floated on the shaft 109 between the adjacent ear 106 and the cam member 111. By referring to Figures 3 and 6 it will be seen that rotation of this floating cam member 113 will cause the cam face thereof to cooperate with the cam faces of the cam member 111 to move it longitudinally of the shaft and against the adjacent ear 106 so that rotation of the cam member 113 in one direction will cause the band 92 to contract on the brake drum 89 to effect the braking of the motor vehicle. The floating cam member 113 has a segmental pinion 114 formed preferably integrally therewith.

A combination brake and auxiliary transmission operating lever 115 is mounted in a vertically extending sleeve 116 which forms a part of the transmission housing 10, this sleeve 116 being so formed that it forms a support so the lever 115 may either be moved laterally in the direction of the arrow 117 or longitudinally in the direction of the arrow 118. Movement of the lever 115 in the direction of the arrow 118, that is longitudinal movement of the upper end thereof relative to the vehicle, is designed to operate the brake band 92 while lateral or transverse movement of the lever 115 in the direction of the arrow 117 is designed to operate the auxiliary transmission clutch. The lower end of the lever 115 is connected with the fork 119 at the forward end of an operating rod 120 which is mounted to rotate or move longitudinally in the housing 10. The rear end of the operating rod 120 is splined at 121 and a forked member 122 is slidably but non-rotatably mounted on these splines 121 in position where the arms 123 of the forked member 122 may engage the arm 95 of the bell crank lever to swing the forward end of that arm from side to side when the operating rod 120 is rotated. From the foregoing description it will be seen that transverse or lateral movement of the lever 115 in the direction of the arrow 117 will rotate the operating rod 120 to swing the bell crank lever by means of the fork 122 to thereby operate the bell crank to shift the double ended auxiliary transmission clutch member 79 longitudinally to thereby engage either the direct or reduction gear drive of the auxiliary transmission or place the clutch in neutral.

The operating rod 120 has rack teeth 124 formed thereon which engage the teeth 114 of the cam 113 whereby longitudinal reciprocation of the operating rod 120 will rotate the cam member 113 to thereby operate the brake 92. Movement of the combined brake and auxiliary transmission operating lever 115 longitudinally, that is in the direction of the arrow 118, will reciprocate the operating rod 120 to thereby cause this rotation of the cam 113 which in turn will operate the brake 92. It will be noted that the spline mounting of the forked member 122 which operates the auxiliary transmission clutch will permit this longitudinal movement of the operating rod 120 without interfering with the position of the forked member 122 as the operating rod will merely slide therein when moved longitudinally.

This operating member 122 may be held from longitudinal movement relative to the transmission housing 10 by any suitable bosses extending from the interior of the transmission housing.

From the foregoing it will be seen that longitudinal and lateral movement of the combined brake and auxiliary transmission operating lever 115 will selectively operate either or both the brake and the auxiliary transmission clutch.

Figure 1:
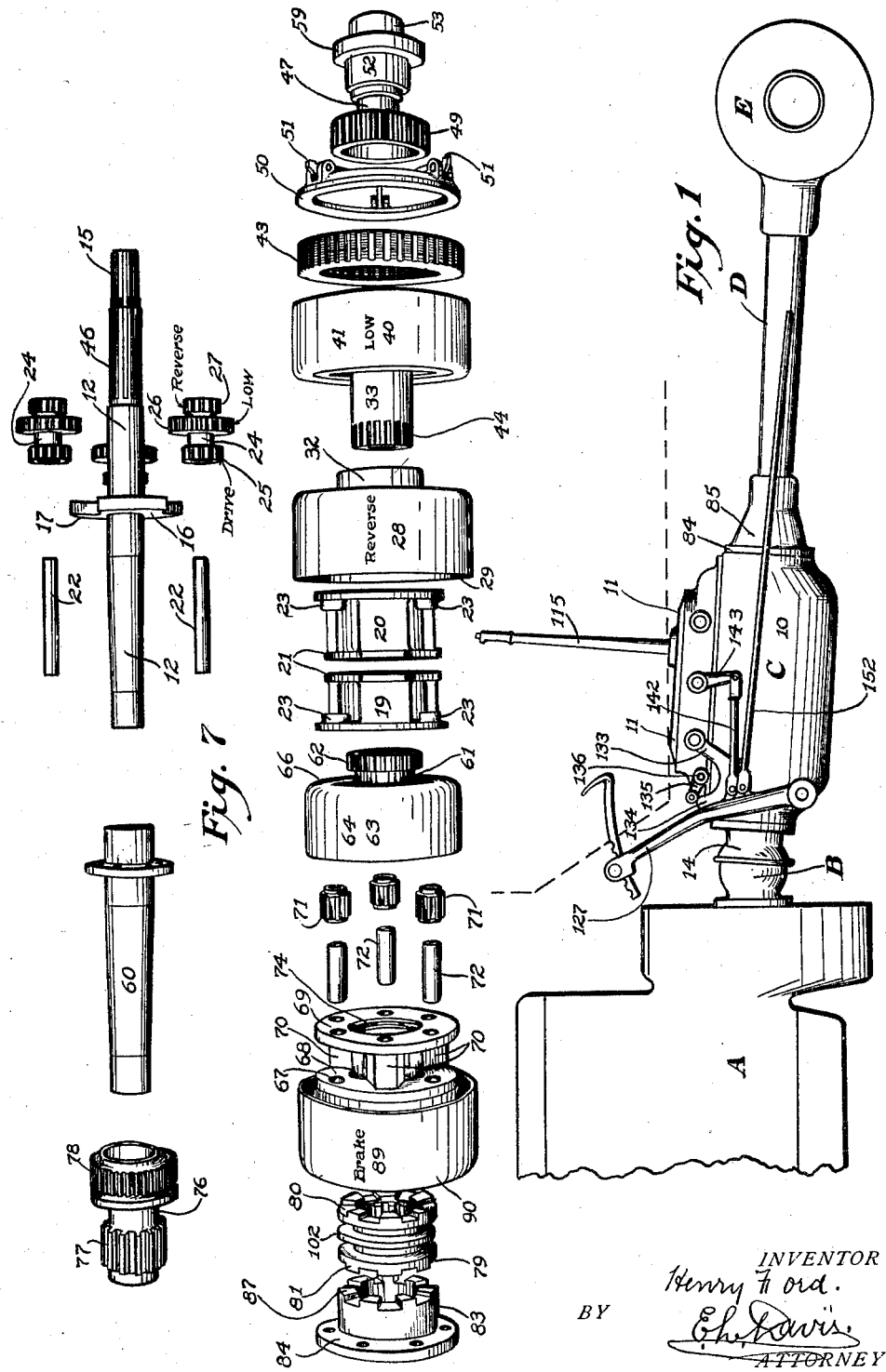
Figure 1 shows a side elevation of a somewhat diagrammatic view of an engine, universal joint, transmission, drive shaft and rear axle, such as is normally used in connection with a motor vehicle and having my improved transmission illustrated therein.
Figure 5:
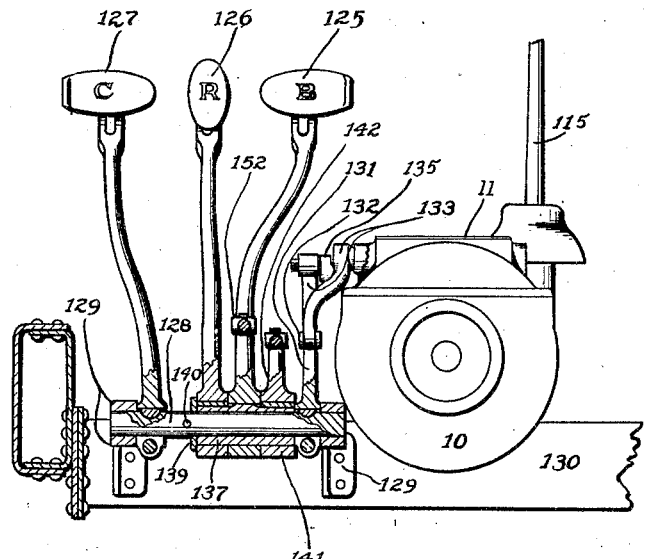
Figure 5 shows an end elevation of the transmission device and illustrates the manner of installing the control pedals.

Referring to Figures 1 and 5 it will be seen that I have provided a plurality of pedal members for operating the various parts of my improved motor vehicle. These pedals as illustrated in Figure 5, comprise the brake pedal 125, the reverse pedal 126 and the low speed and clutch pedal 127.

The low speed pedal 127 is fixed to the shaft 128 which in turn is journaled in brackets 129 which are mounted on a transverse frame member 130 of the vehicle. I have purposely omitted this transverse frame member 130 and the brackets 129 from the showing in Figure 1 because this frame member would hide the universal joint B and is of ordinary construction such as is usually used in connection with the frames of motor vehicles. The shaft 128 is keyed to a vertically extending arm 131 which in turn is connected by a forked link 132 to an arm 133 which operates a cam mechanism similar to that of the low speed drum 40. The arm 133 has an extension 134 which engages an operating arm 135 which is secured to the end of the shaft 136 which extends into the transmission housing 10 and operates the clutch shifting fork 57.

From the description of the foregoing parts, it will be seen that pressing down the low speed and clutch pedal 127 will rotate the shaft 128 to swing the arm 131 which reciprocates the link 132 to swing the arm 133 which operates the low speed band and the clutch fork. The connection of these parts is such that when the pedal 127 is pushed clear down, then the action of the extension 134 on the arm 133 will throw out the clutch 43 through the action of the arm 135 and the shaft 136 and at the same time the low speed band 45 will engage the low speed drum 40 so that if the engine is operating the vehicle will be caused to proceed in low speed. If the pressure on the low speed pedal 127 is released to permit it to come most of the way toward its normal position, as illustrated in Figure 1, then this movement will disengage the low speed band 45 from the low speed drum 40 and also will retain the clutch 43 in inoperative position. If, however, the low speed pedal 127 is entirely released, then the spring of the clutch 43 will return it to its normal position as illustrated in Figure 1 which will permit the low speed drive connection to be entirely released and the high speed clutch to be engaged so that there will be a direct drive through the main transmission. The reverse pedal 126 is splined to a sleeve 137 which is rotatably but non-slidably mounted on the shaft 128 by means of a washer 139 and pin 140 and the arm 131. A second arm 141 is secured to this sleeve 137 and connected by a link 142 with the arm 143 which operates the reverse band. This arm 143 is held from rotation on the reverse operating shaft 144 by a deformed washer 145 which coacts with the nut 146 threaded on the shaft 144. This shaft 144 is mounted at 147 in the transmission housing 10, the enlarged end thereof forming a stop for one ear 148 of the reverse brake band. A combined cam and brake operating sleeve 149 is floated on the shaft 144 in the housing 10 in position to coact with the second ear 150 of the reverse band so that when the cam faces 151 of the cam sleeve 149 and the arm 143 are rotated relative to each other, then the cam sleeve 149 will be reciprocated in the housing 10 to thereby move the ear 150 toward the ear 148 thereby contracting the reverse band 30 on the reverse drum 28 to thereby hold the reverse drum from movement so that if the engine is operating the sleeve 61 will be rotated in the opposite direction from the shaft 12 and at a much lower speed. In other words, the car will be put in reverse.

From the foregoing it will be seen that if the reverse pedal 126 is depressed sufficiently, the connections of the parts heretobefore described will contract the reverse band on the reverse drum to thereby cause the transmission to reverse the direction of movement of the motor vehicle.

The brake pedal 125 is rotatably but nonslidably mounted on the sleeve 137 and between the reverse pedal 125 and the arm 142. This brake pedal 125 is connected by a link 152 to any suitable braking mechanism associated with the rear axle and rear wheels of the motor vehicle. The construction and connections of these rear wheel brakes are not shown as they form no part of my invention except in so far as they are operated by the brake pedal 125 which I have provided in connection with my transmission.

From the foregoing description of the construction and connections of the various parts of my improved device it will be seen that I have provided means whereby my improved transmission may be operated normally through the low speed and clutch, the reverse, and the brake pedals; that is, the depression and subsequent release of the low speed and clutch pedal will first start the motor vehicle in low and subsequently switch the drive to high when released, the pressure on the reverse pedal will reverse the direction of the movement of the motor vehicle and the pressure on the brake pedal 125 or longitudinal movement of the shifter lever 115 will stop the vehicle.

In certain cases such for instance as in connection with the use of trucks which are heavily laden when they start out to make deliveries and empty when they return, or in the case of ascending or descending grades with either trucks or pleasure vehicles, it is desirable that the vehicle should be handled with the ordinary controls used in the ordinary manner. The ordinary gear drive, however, between the motor and the rear axle is not ordinarily satisfactory so that the vehicle can be handled with the normal controls under varying conditions of load, traffic and grades. On the other hand, it is not safe to change the normal vehicle controls for special service such as hills, traffic and heavy loads as the automatic operation of such controls by the operator is one of the great factors of safe driving. With my improved transmission it will be seen that if the vehicle is to be heavily laden or is to be driven on steep grades or in heavy traffic, the shifter lever 115 may be swung transversely or laterally to cut in the reduction gearing of the auxiliary transmission to thereby give the additional power required, while at the same time the ordinary control of the vehicle in stopping, starting and the like is not varied. If it is desired to transport a heavy load for some distance, it will be seen that the shifter lever 115 may be operated to cut in the reduction gear of the auxiliary transmision while the heavy load is being hauled, and then when the vehicle is returning empty the shifter lever may be again operated to cut out the reduction gear and give a direct drive so that the vehicle may proceed more rapidly and without the waste of power and fuel.

Many advantages result from the use of my improved transmission in addition to those already brought out, as I have provided a very compact construction wherein the reduction gears of the main transmission are housed substantially within the reverse drum, the clutch is housed within the low speed drum and the auxiliary transmission is housed within the brake drum. Moreover, I have a positive connection between the transmission brake drum and the drive shaft at all times. The combination of the control of the transmission brake with the control of the auxiliary transmission presents a further obvious advantage. Further the auxiliary transmission clutch may be placed in neutral position to facilitate starting the engine or to make it easier to push or tow the vehicle when desired.

I claim as my invention:

1. In a transmission, a housing, a driving shaft, a driven shaft, a pair of transmission drums therein, epicycloidal reverse and forward reduction gearing disposed in one of said drums, auxiliary planetary reduction gearing disposed in the other drum, means for operatively connecting the gearing with said drums and shafts whereby the speed of the driven shaft relative to the driving shaft may be controlled by one of said drums, and means for operatively connecting the other drum to the driven shaft whereby said drum may be used to brake the driven shaft.

2. In a transmission, a housing, a driving shaft, a driven shaft, a pair of transmission drums disposed in the housing, epicycloidal gearing disposed within one of said drums, auxiliary planetary reduction gearing disposed within the other drum, means for operatively connecting one of said drums with the epicycloidal gearing and shafts to control the speed ratio of the shafts, means for connecting the auxiliary gearing and driven shaft with the other drum whereby said drum may brake the driven shaft, and means for selectively rendering said planetary reduction gearing operative and in-operative to vary selectively the speed ratio of the shafts.

3. In a transmission, a housing, aligned shafts extending into said housing from the ends thereof, an auxiliary planetary reduction gearing mounted in said housing, a brake drum mounted in said housing and designed to receive said planetary reduction gearings within the outline thereof, a reverse speed drum mounted in said housing, main transmission low and reverse gearing mounted within the lines of said reverse drum, a low speed drum mounted within said transmission, a main transmission clutch mounted within said low speed drum, means for operatively connecting said shafts through said clutch and main transmission gearing, said connection through the main transmission gearing being controlled through said low and reverse drums, means for connecting said brake drum with one of said shafts, and means for independently controlling said auxiliary reduction gearing.

HENRY FORD.